US009895959B2

(12) United States Patent
Seto et al.

(10) Patent No.: US 9,895,959 B2
(45) Date of Patent: Feb. 20, 2018

(54) REFRIGERANT CIRCULATION APPARATUS WITH CONTROLLED OPERATION OF AN EVPORATOR FOR ON-VEHICLE BATTERY COOLING

(71) Applicant: MITSUBISHI JIDOSHA KOGYO KABUSHIKI KAISHA, Tokyo (JP)

(72) Inventors: Hiroki Seto, Aichi (JP); Shinsaku Tomita, Owariasahi (JP); Hiroyuki Suzuki, Okazaki (JP); Shigeharu Ishii, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 454 days.

(21) Appl. No.: 14/441,757

(22) PCT Filed: Nov. 26, 2013

(86) PCT No.: PCT/JP2013/081760
§ 371 (c)(1),
(2) Date: May 8, 2015

(87) PCT Pub. No.: WO2014/097831
PCT Pub. Date: Jun. 26, 2014

(65) Prior Publication Data
US 2015/0291008 A1 Oct. 15, 2015

(30) Foreign Application Priority Data
Dec. 18, 2012 (JP) .................................. 2012-276021

(51) Int. Cl.
*F25B 41/00* (2006.01)
*B60H 1/32* (2006.01)
(Continued)

(52) U.S. Cl.
CPC ....... *B60H 1/3216* (2013.01); *B60H 1/00278* (2013.01); *B60H 1/00385* (2013.01);
(Continued)

(58) Field of Classification Search
CPC .............. B60H 1/3216; B60H 1/00278; B60H 1/00385; B60L 1/02; B60L 1/003; B60L 11/1874
See application file for complete search history.

(56) References Cited

U.S. PATENT DOCUMENTS 3,984,224 A * 10/1976 Dawkins .............. B60H 1/3204
62/236
5,501,267 A * 3/1996 Iritani ................ B60H 1/00007
165/11.1
(Continued)

FOREIGN PATENT DOCUMENTS

EP 1344667 A1 9/2003
JP 2003-279180 A 10/2003
(Continued)

Primary Examiner — Ljiljana Ciric
(74) Attorney, Agent, or Firm — Birch, Stewart, Kolasch & Birch, LLP (57) ABSTRACT

A refrigerant circulation apparatus includes: a vehicle-interior air conditioning (2) that cools an interior of a vehicle; an on-vehicle battery cooler (3) that includes an evaporator for on-vehicle battery cooling (32) that cools an on-vehicle battery mounted on the vehicle; and an electric compressor (5) that compresses and supplies a refrigerant to at least one of the vehicle-interior air conditioning (2) and the on-vehicle battery cooling (3). The apparatus also includes: a temperature sensor (41) that detects a temperature of the electric compressor (5); a pressure sensor (42) that detects a pressure of the refrigerant compressed by the electric compressor (5); and a control unit (40) that restricts operation of the evaporator for on-vehicle battery cooling (32) to reduce load on
(Continued)

the electric compressor (5) based on the temperature of the electric compressor (5) and the pressure of the refrigerant.

16 Claims, 3 Drawing Sheets

(51) Int. Cl.
    *B60L 1/00* (2006.01)
    *B60L 1/02* (2006.01)
    *B60L 11/18* (2006.01)
    *B60H 1/00* (2006.01)

(52) U.S. Cl.
    CPC ............ *B60L 1/003* (2013.01); *B60L 1/02* (2013.01); *B60L 11/1874* (2013.01); *B60H 2001/00307* (2013.01); *B60L 2240/34* (2013.01); *B60L 2240/36* (2013.01); *B60L 2240/545* (2013.01); *F25B 2600/2513* (2013.01); *F25B 2700/195* (2013.01); *F25B 2700/1931* (2013.01); *F25B 2700/2115* (2013.01); *Y02T 10/705* (2013.01); *Y02T 10/7005* (2013.01)

(56) References Cited

U.S. PATENT DOCUMENTS

| | | | | |
|---|---|---|---|---|
| 5,507,153 A * | 4/1996 | Seto | B60H 1/00392 | 188/159 |
| 5,555,737 A * | 9/1996 | Takeo | B60H 1/00392 | 62/230 |
| 5,557,941 A * | 9/1996 | Hanson | B60H 1/3232 | 165/268 |
| 5,605,051 A * | 2/1997 | Iritani | B60H 1/3211 | 62/160 |
| 5,878,589 A * | 3/1999 | Tanaka | B60H 1/00007 | 165/80.2 |
| 6,070,650 A * | 6/2000 | Inoue | B60H 1/00428 | 165/202 |
| 6,077,158 A * | 6/2000 | Lake | B60H 1/00278 | 165/249 |
| 6,138,466 A | 10/2000 | Lake et al. | | |
| 6,178,760 B1 * | 1/2001 | Tanaka | B60H 1/00392 | 62/154 |
| 6,357,541 B1 * | 3/2002 | Matsuda | B60K 6/22 | 165/43 |
| 6,481,230 B2 * | 11/2002 | Kimishima | B60H 1/323 | 62/238.7 |
| 7,841,431 B2 * | 11/2010 | Zhou | B60H 1/00278 | 180/65.1 |
| 7,975,757 B2 * | 7/2011 | Nemesh | B60H 1/00278 | 165/42 |
| 8,215,432 B2 * | 7/2012 | Nemesh | B60H 1/00278 | 180/68.1 |
| 8,395,358 B2 * | 3/2013 | Gaben | H01M 10/4207 | 320/150 |
| 8,932,743 B2 * | 1/2015 | Simonini | B60L 1/04 | 429/120 |
| 9,103,573 B2 * | 8/2015 | Goenka | B60H 1/00278 | |
| 9,440,514 B2 * | 9/2016 | Kondo | B60H 1/2225 | |
| 2001/0015070 A1 * | 8/2001 | Hara | B60H 1/3208 | 62/133 |
| 2002/0112489 A1 * | 8/2002 | Egawa | B60H 1/3208 | 62/133 |
| 2003/0010487 A1 * | 1/2003 | Ieda | B60H 1/00428 | 165/202 |
| 2004/0256082 A1 * | 12/2004 | Bracciano | B60H 1/00392 | 165/42 |
| 2005/0028542 A1 | 2/2005 | Yoshida et al. | | |
| 2005/0035657 A1 * | 2/2005 | Brummett | B60H 1/3226 | 307/10.1 |
| 2009/0020620 A1 * | 1/2009 | Douarre | B60H 1/00278 | 237/12.3 R |
| 2009/0133859 A1 * | 5/2009 | Suzuki | B60H 1/00278 | 165/121 |
| 2009/0139781 A1 * | 6/2009 | Straubel | B60L 11/1875 | 180/65.1 |
| 2009/0193825 A1 * | 8/2009 | Hara | B60H 1/00642 | 62/132 |
| 2009/0249802 A1 * | 10/2009 | Nemesh | B60H 1/00278 | 62/56 |
| 2011/0113800 A1 | 5/2011 | Sekiya et al. | | |
| 2012/0048504 A1 | 3/2012 | Park et al. | | |
| 2012/0205088 A1 * | 8/2012 | Morisita | B60H 1/00921 | 165/202 |
| 2013/0240175 A1 * | 9/2013 | Tschismar | B60H 1/00278 | 165/43 |
| 2013/0298583 A1 * | 11/2013 | O'Donnell | H01M 6/5038 | 62/115 |
| 2014/0053584 A1 * | 2/2014 | Tschismar | B60H 1/00278 | 62/115 |
| 2014/0096550 A1 * | 4/2014 | Gao | B60L 11/1874 | 62/115 |
| 2014/0182832 A1 * | 7/2014 | Styles | B60H 1/00278 | 165/202 |
| 2014/0326430 A1 * | 11/2014 | Carpenter | B60L 11/1874 | 165/41 |
| 2014/0338376 A1 * | 11/2014 | Carpenter | B60L 1/003 | 62/115 |
| 2015/0101789 A1 * | 4/2015 | Enomoto | B60H 1/00485 | 165/202 |
| 2015/0224849 A1 * | 8/2015 | Takeuchi | F25B 5/00 | 62/243 |
| 2017/0313158 A1 * | 11/2017 | Porras | B60H 1/00892 | |

FOREIGN PATENT DOCUMENTS

| | | |
|---|---|---|
| JP | 2011-105150 A | 6/2011 |
| JP | 2012-46163 A | 6/2011 |
| JP | 201230663 A | 2/2012 |

* cited by examiner

REFRIGERANT CIRCULATION APPARATUS WITH CONTROLLED OPERATION OF AN EVPORATOR FOR ON-VEHICLE BATTERY COOLING

TECHNICAL FIELD

The present invention relates to a thermal protection technique for an electric compressor in a refrigerant circulation apparatus mounted on a vehicle.

BACKGROUND ART

In vehicles having no engines or vehicles whose engines are occasionally out of operation during traveling, such as electric vehicles and hybrid vehicles that have recently been developed, electric compressors are used for refrigerant compression in air conditioners of the vehicles.

On electric vehicles and hybrid vehicles, high-voltage batteries for traveling driving are mounted, and in order to maintain the temperature of the on-vehicle batteries at an appropriate temperature, there have been proposed vehicles having such a configuration that uses air conditioners of the vehicles to control the temperature of on-vehicle batteries.

Such a vehicle is configured to include an evaporator for cooling an on-vehicle battery together with an evaporator for cooling an vehicle interior in a refrigerant circulation passage, for example, and a compressed refrigerant is supplied to both the evaporator for vehicle-interior cooling and the evaporator for on-vehicle battery cooling by using the same compressor.

The described above technique of using part of a heat medium used for an air conditioner for a vehicle interior to control the temperature of equipment mounted on the vehicle is well known as a conventional art. For example, Patent Document 1 discloses that cooling water of an engine is used for a vehicle-interior heating apparatus, and part of this cooling water is used to be heat-exchanged with a gear box so as to control the temperature of the gear box.

PRIOR ART DOCUMENT

Patent Document

Patent Document 1: Japanese Patent Laid-Open No. 2012-46163

SUMMARY OF THE INVENTION

Problems to be Solved by the Invention

An electric compressor like the aforementioned electric compressor is provided with electronic equipment for controlling the operation of the compressor. Increase in temperature of the electronic equipment for control included in the electric compressor is suppressed to some extent by a refrigerant passing through the electric compressor, but increase in load on the electric compressor may cause higher increase in temperature of the electric compressor in accordance with increase in driving currents.

In the above vehicle that can control both temperatures of the vehicle interior and the on-vehicle battery with the identical compressor in particular, the load of the electric compressor becomes further higher, so that the temperature of the electronic equipment for control of the electric compressor may become higher than an allowance.

An object of the present invention, which has been made in order to solve the problems described above, is to provide a vehicle air conditioning apparatus capable of suppressing increase in temperature of an electric compressor so as to protect the electric compressor, in the case of the vehicle air conditioning apparatus that can control both temperatures of a vehicle interior and an on-vehicle battery using the electric compressor.

Means for Solving the Problems

In order to achieve the above object, a refrigerant circulation apparatus of claim 1 is configure to include: a vehicle-interior air conditioner configured to cool an interior of a vehicle; an on-vehicle battery cooler including an evaporator for on-vehicle battery cooling configured to cool an on-vehicle battery mounted on the vehicle; an electric compressor configured to compress and supply a refrigerant to one or both of the vehicle-interior air conditioner and the on-vehicle battery cooler; temperature detection unit configured to detect a temperature of the electric compressor; pressure detection unit configured to detect a pressure of the refrigerant compressed by the electric compressor; and control unit configured to restrict operation of the evaporator for on-vehicle battery cooling so as to reduce load on the electric compressor based on the temperature of the electric compressor and the pressure of the refrigerant.

The refrigerant circulation apparatus of claim 2, in claim 1, is configured such that the vehicle-interior air conditioner includes: the evaporator for vehicle-interior air conditioning; and an internal-external air switching unit configured to allow conditioned air to be switched to external air outside the vehicle interior or to internal air in the vehicle interior, the conditioned air heat-exchanged with the refrigerant in the evaporator for vehicle-interior air conditioning to be supplied into the vehicle-interior, and the control unit switches the internal-external air switching unit to heat-exchange the internal air in the vehicle interior with the refrigerant so as to reduce the load on the electric compressor.

The refrigerant circulation apparatus of claim 3, in claim 1 or claim 2, is configured such that the on-vehicle battery cooler includes a blower fan configured to supply the conditioned air to the evaporator for on-vehicle battery cooling, and the control unit decreases a rotational rate of the blower fan so as to reduce the load on the electric compressor.

The vehicle air conditioning apparatus of claim 4, in any one of claim 1 to claim 3, is configured to further include: a condenser configured to cool the refrigerant by heat-exchanging the refrigerant compressed by the electric compressor with the external air outside the vehicle interior; and a condenser fan configured to introduce the external air outside the vehicle interior into the condenser, wherein the control unit increases a rotational rate of the condenser fan so as to reduce the load on the electric compressor.

The vehicle air conditioning apparatus of claim 5, in any one of claim 1 to claim 4, is configured such that the electric compressor includes: an electric motor configured to operate a compressor to compress the refrigerant; and electronic equipment for control so disposed adjacent to the electric motor as to control the operation of the electric motor, and the temperature detection unit detects a temperature of the electronic equipment for control.

Advantageous Effects of the Invention

According to the invention of the claim 1, because of restricting the operation of the evaporator for on-vehicle battery cooling so as to reduce load on the electric compressor based on the temperature of the electric compressor and the pressure of the refrigerant compressed by the electric compressor, it is possible to reduce the load on the electric compressor while maintaining the air conditioning performance for the vehicle interior through the evaporator for vehicle interior air conditioning; and thus it is possible to suppress increase in temperature of the electric compressor, particularly increase in temperature of the electronic equipment for control included in the electric compressor without deteriorating comfort of occupants in the vehicle interior, which attains protection of the electric compressor.

According to the invention of claim 2, the internal-external air switching unit is switched to heat-exchange the internal air in the vehicle interior with the refrigerant in the evaporator for vehicle interior air conditioning so as to suppress the amount of the heat exchange in the evaporator for vehicle-interior air conditioning, thereby reducing the load on the electric compressor. Accordingly, it is possible to reduce the load on the electric compressor while maintaining the air conditioning performance for both the vehicle interior and the on-vehicle battery, thereby suppressing increase in temperature of the electric compressor without deteriorating the comfort of the occupants in the vehicle interior, which attains protection of the electric compressor.

According to the invention of claim 3, the rotational rate of the blower fan for supplying the conditioned air to the evaporator for on-vehicle battery cooling is decreased so as to suppress the amount of the heat exchange in the evaporator for on-vehicle battery cooling, thereby reducing the load on the electric compressor. Accordingly, it is possible to reduce the load on the electric compressor while maintaining the air conditioning performance for the vehicle interior, thereby suppressing increase in temperature of the electric compressor without deteriorating the comfort of the occupants in the vehicle interior, which attains protection of the electric compressor.

According to the invention of claim 4, the rotational rate of the condenser fan is increased to enhance cooling efficiency of the refrigerant, and suppress the amount of the heat exchange in the evaporator for on-vehicle battery cooling, thereby reducing the load on the electric compressor.

According to the invention of claim 5, the temperature of the electronic equipment for control that requires protection can be directly detected by the temperature detection unit, thereby accurately suppressing the load on the electric compressor.

MODE FOR CARRYING OUT THE INVENTION

An embodiment of the present invention will be described with reference to drawings, hereinafter.

Figure 1:
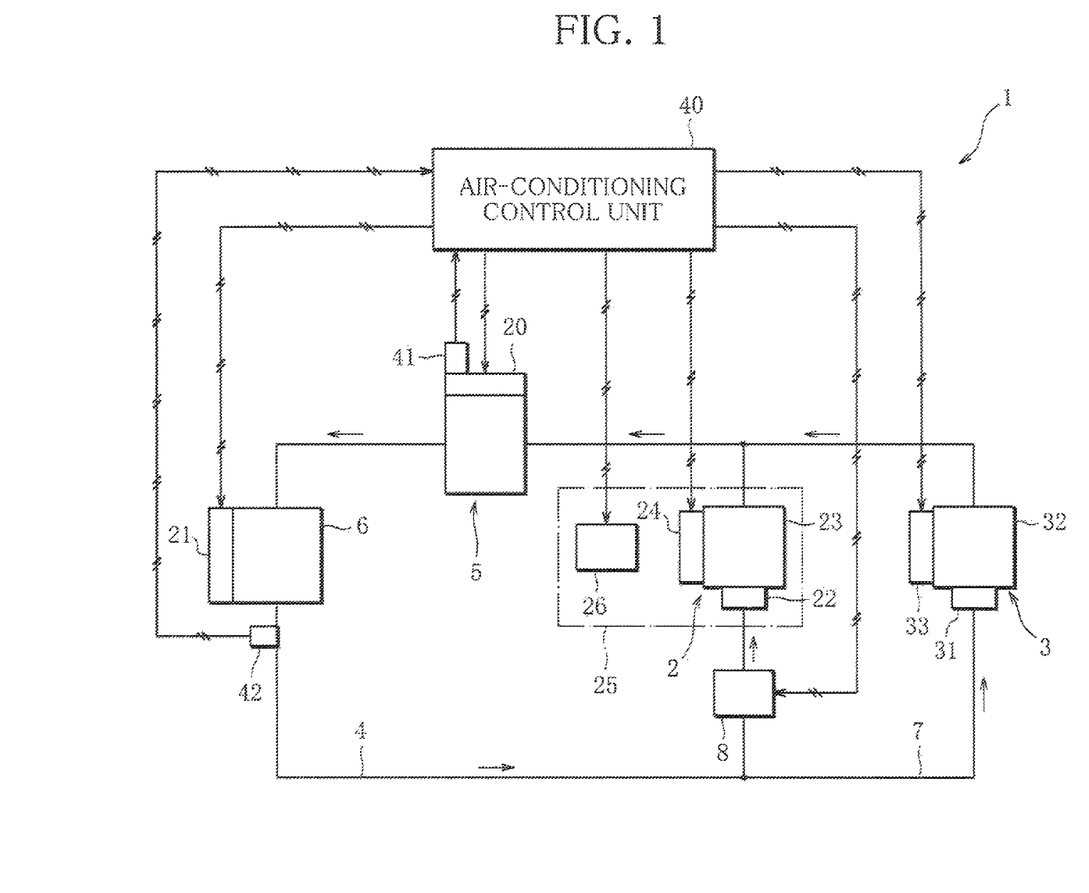
FIG. 1 is a schematic structural view of a vehicle air conditioning apparatus according to one embodiment of the present invention.

FIG. 1 is a schematic structural view of a vehicle air conditioning apparatus 1 according to one embodiment of the present invention.

The vehicle air conditioning apparatus 1 according to the present embodiment is installed in a plugin hybrid vehicle (referred to as a vehicle, hereinafter).

An on-vehicle battery (a driving battery) for supplying electric power to a traveling motor is mounted on the vehicle. The on-vehicle battery outputs high voltage electric power, and temperature thereof is likely to become high, and thus a cooling apparatus is provided therewith to prevent excessive increase in temperature in the summer season or at the time of having no traveling air when the vehicle is stopped, or the like.

The cooling apparatus of the on-vehicle battery uses an air conditioner for controlling a vehicle-interior temperature; specifically as shown in FIG. 1, the vehicle air conditioning apparatus (a refrigerant circulation apparatus) 1 is equipped with an evaporator unit for on-vehicle battery cooling (an on-vehicle battery cooler) 3 together with an evaporator unit for vehicle-interior air conditioning (a vehicle-interior air conditioner) 2.

In a refrigerant circulation passage 4 of the vehicle air conditioning apparatus 1, an electric compressor 5, a condenser 6, and the evaporator unit for vehicle-interior air conditioning 2 are disposed in the order of the circulating direction of the refrigerant. In addition, in the present embodiment, a branch passage 7 is provided in such a manner that the branch passage 7 branches from the circulation passage 4 at a position between the condenser 6 and the evaporator unit for vehicle-interior air conditioning 2, and is joined to the circulation passage 4 at a position between the evaporator unit for vehicle-interior air conditioning 2 and the electric compressor 5. The evaporator unit for on-vehicle battery cooling 3 is disposed in the branch passage 7. There is provided a solenoid valve 8 for opening and closing the circulation passage 4 located between a branch position of the branch passage 7 and the evaporator unit for vehicle-interior air conditioning 2.

The electric compressor 5 has a function of compressing the refrigerant by operating a compressor thereof with an incorporated electric motor. The electric compressor 5 is equipped with a control unit 20 (electronic equipment for control) for controlling operation of the electric motor. The control unit 20 includes electronic equipment for supplying electric power to the electric motor, such an inverter.

The condenser 6 has a function of cooling the refrigerant through heat exchange between the high-temperature high-pressure refrigerant compressed by the electric compressor 5 and the outside air. The condenser 6 is equipped with a condenser fan 21 for introducing the outside air.

The evaporator unit for vehicle-interior air conditioning 2 includes an expansion valve 22, an evaporator (an evaporator for vehicle-interior air conditioning 23), and a blower fan 24. The expansion valve 22 has a function of expanding the high-pressure low-temperature refrigerant discharged from the condenser 6. The blower fan 24 has a function of supplying the external air outside the vehicle interior or the interior air in the vehicle interior (conditioned air) to the evaporator for vehicle-interior air conditioning 23. The evaporator for vehicle-interior air conditioning 23 has a function of heat-exchanging the low-temperature normal-pressure refrigerant expanded by the expansion valve 22 with the conditioned air supplied from the blower fan 24. The conditioned air heat-exchanged and cooled in the evaporator for vehicle-interior air conditioning 23 is supplied into the vehicle interior, thereby controlling the vehicle-interior temperature.

The evaporator unit for vehicle-interior air conditioning 2 is included in a vehicle-interior air conditioning unit 25 (an HVAC unit) located at a front position of the vehicle interior, and the vehicle-interior air conditioning unit 25 includes an internal-external air switching damper 26 (internal-external air switching unit) used for switching the conditioned air to be supplied to the evaporator for vehicle-interior air conditioning 23 between the internal air and the external air.

As similar to the evaporator unit for vehicle-interior air conditioning 2, the evaporator unit for on-vehicle battery cooling 3 includes an expansion valve 31, an evaporator (an evaporator for on-vehicle battery cooling 32), and a blower fan 33; and the conditioned air heat-exchanged and cooled in the evaporator for on-vehicle battery cooling 32 is used for cooling the on-vehicle battery.

The solenoid valve 8 has a function of allowing the refrigerant discharged from the condenser 6 to be supplied to the evaporator unit for vehicle-interior air conditioning 2 when opening its valve, and allowing the entire refrigerant discharged from the condenser 6 to be supplied to the evaporator unit for on-vehicle battery cooling 3 when closing its valve.

The operations of the electric compressor 5, the condenser fan 21, the blower fan 24 of the evaporator unit for vehicle-interior air conditioning 2, the internal-external air switching damper 26, the blower fan 33 of the evaporator unit for on-vehicle battery cooling 3, and the solenoid valve 8 are controlled by an air-conditioning control unit 40 (control unit).

In addition, the electric compressor 5 is equipped with a temperature sensor 41 (temperature detection unit) for detecting an inner temperature Tc of the electric compressor 5, specifically, a temperature of the control unit 20. The circulation passage 4 for the refrigerant includes a pressure sensor 42 (pressure detection unit) for detecting a pressure Pa of the refrigerant output from the condenser 6.

The air-conditioning control unit 40 includes an input-output device, a memory device (such as ROM, RAM, and nonvolatile RAM), and a central processing unit (CPU), etc. The air-conditioning control unit 40 controls the various vehicle air conditioning equipment, such as the electric compressor 5, based on the setting temperature, the vehicle-interior temperature, and the like so as to exert a function to perform a normal control on the operation of the various vehicle air conditioning equipment in the vehicle air conditioning apparatus 1 for the purpose of controlling the vehicle-interior temperature, and also exert a function to close the solenoid valve 8 at the time of excessive increase in temperature of the on-vehicle battery, thus dedicating to cooling of the on-vehicle battery.

In addition, the present embodiment provides a temperature control function of inputting the inner temperature Tc of the electric compressor 5 from the temperature sensor 41, and inputting the pressure Pa of the refrigerant from the pressure sensor 42 to perform control for forcibly changing operational conditions of the various vehicle air conditioning equipment, such as the internal-external air switching damper 26, the blower fan 33 of the evaporator unit for on-vehicle battery cooling 3, the condenser fan 21, and the electric compressor 5, so as to suppress increase in temperature of the control unit 20 of the electric compressor 5.

Figure 2:
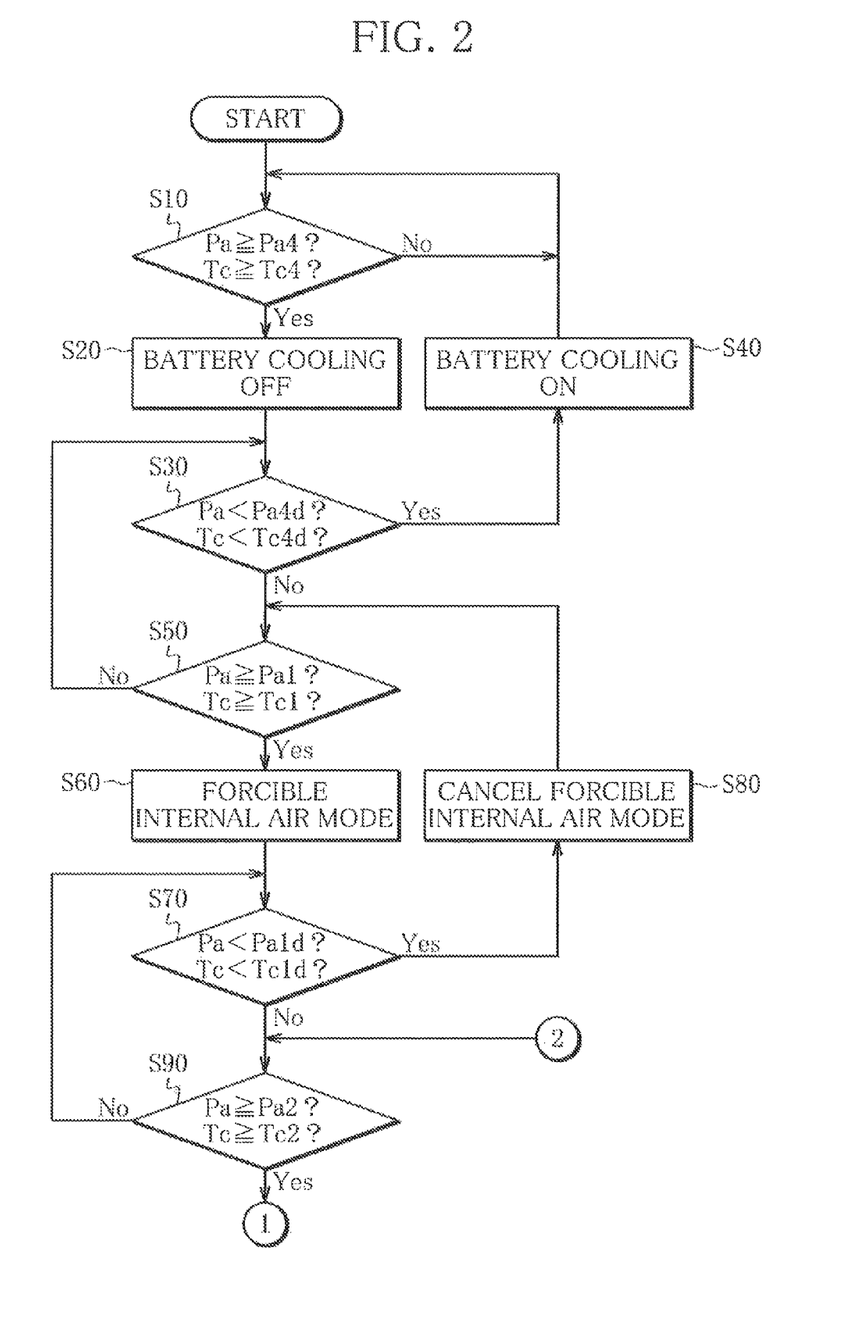
FIG. 2 is a flow chart showing an outline of temperature control on an electric compressor in an air-conditioning control unit of the present embodiment.
Figure 3:
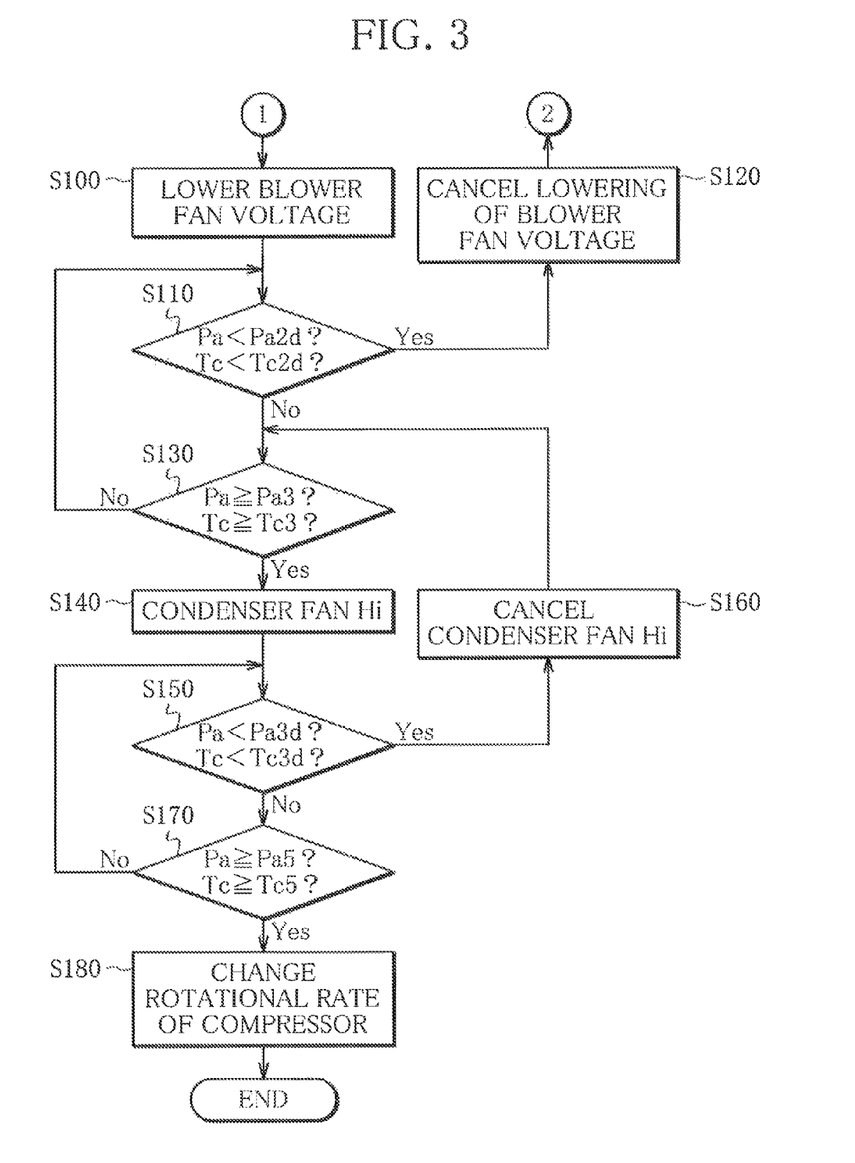
FIG. 3 is a flow chart showing an outline of the temperature control on the electric compressor in the air-conditioning control unit of the present embodiment.

FIG. 2 and FIG. 3 are a flow chart showing an outline of the temperature control on the electric compressor 5 in the air-conditioning control unit 40.

The present routine is repetitively carried out at every predetermined time interval during the operation of the vehicle air conditioning apparatus 1.

First, in step S10, the pressure Pa is input from the pressure sensor 42, and the inner temperature Tc is input from the temperature sensor 41, and then it is determined whether or not the pressure Pa is not less than a threshold value Pa4 and the inner temperature Tc is not less than a threshold value Tc4. If the pressure Pa is not less than the threshold value Pa4 and the inner temperature Tc is not less than the threshold value Tc4, the routine advances to step S20. If the pressure Pa is less than the threshold value Pa4 or the inner temperature Tc is less than the threshold value Tc4, the routine returns to step S10.

In step S20, the battery cooling is set to be OFF. Specifically, the blower fan 33 of the evaporator unit for on-vehicle battery cooling 3 is stopped. Then, the routine advances to step S30.

In step S30, the pressure Pa is input from the pressure sensor 42, and the inner temperature Tc is input from the temperature sensor 41, and then it is determined whether or not the pressure Pa is less than a threshold value Pa4$d$ and the inner temperature Tc is less than a threshold value Tc4$d$. The threshold value Pa4$d$ is slightly smaller than the above threshold value Pa4, and the threshold value Tc4$d$ is slightly smaller than the threshold value Tc4. If the pressure Pa is less than the threshold value Pa4$d$ and the inner temperature Tc is less than the threshold value Tc4$d$, the routine advances to step S40. If the pressure Pa is not less than the threshold value Pa4$d$ or the inner temperature Tc is not less than the threshold value Tc4$d$, the routine advances to step S50.

In step S40, the battery cooling is set to be ON. Specifically, the blower fan 33 of the evaporator unit for on-vehicle battery cooling 3 is operated. Then, the routine returns to step S10.

In step S50, the pressure Pa is input from the pressure sensor 42, and the inner temperature Tc is input from the temperature sensor 41, and then it is determined whether or not the pressure Pa is not less than a threshold value Pa1 and the inner temperature Tc is not less than a threshold value Tc1. If the pressure Pa is not less than the threshold value Pa1 and the inner temperature Tc is not less than the threshold value Tc1, the routine advances to step S60. If the pressure Pa is less than the threshold value Pa1 or the inner temperature Tc is less than the threshold value Tc1, the routine returns to step S30.

In step S60, a forcible internal air mode is set. Specifically, the internal-external air switching damper 26 is so operated as to forcibly switch the conditioned air to be supplied to the evaporator for vehicle-interior air conditioning 23 to the internal air circulation. Then the routine advances to step S70.

In step S70, the pressure Pa is input from the pressure sensor 42, and the inner temperature Tc is input from the temperature sensor 41, and then it is determined whether or not the pressure Pa is less than a threshold value Pa1$d$ and the inner temperature Tc is less than a threshold value Tc1$d$. The threshold value Pa1$d$ is slightly smaller than the above threshold value Pa1, and the threshold value Tc1$d$ is slightly smaller than the threshold value Tc1. If the pressure Pa is less than the threshold value Pa1$d$ and the inner temperature Tc is less than the threshold value Tc1$d$, the routine advances to step S80. If the pressure Pa is not less than the threshold value Pa1$d$ or the inner temperature Tc is not less than the threshold value Tc1$d$, the routine advances to step S90.

In step S80, the forcible internal air mode is canceled. Then, the routine advances to step S50.

In step S90, the pressure Pa is input from the pressure sensor 42, and the inner temperature Tc is input from the temperature sensor 41, and then it is determined whether or not the pressure Pa is not less than a threshold value Pa2 and the inner temperature Tc is not less than a threshold value Tc2. If the pressure Pa is not less than the threshold value Pa2 and the inner temperature Tc is not less than the threshold value Tc2, the routine advances to step S100. If the pressure Pa is less than the threshold value Pa2 or the inner temperature Tc is less than the threshold value Tc2, the routine returns to step S70.

In step S100, the voltage of the blower fan 33 in the evaporator unit for on-vehicle battery cooling 3 is lowered, that is, the rotational rate of the blower fan 33 is decreased. Then, the routine advances to step S110.

In step S110, the pressure Pa is input from the pressure sensor 42, and the inner temperature Tc is input from the temperature sensor 41, and then it is determined whether or not the pressure Pa is less than a threshold value Pa2$d$ and the inner temperature Tc is less than a threshold value Tc2$d$. The threshold value Pa2$d$ is slightly smaller than the above threshold value Pa2, and the threshold value Tc2$d$ is slightly smaller than the threshold value Tc2. If the pressure Pa is less than the threshold value Pa2$d$ and the inner temperature Tc is less than the threshold value Tc2$d$, the routine advances to step S120. If the pressure Pa is not less than the threshold value Pa2$d$ or the inner temperature Tc is not less than the threshold value Tc2$d$, the routine advances to step S130.

In step S120, the lowering of the voltage of the blower fan 33 in the evaporator unit for on-vehicle battery cooling 3 is canceled. Then, the routine returns to step S90.

In step S130, the pressure Pa is input from the pressure sensor 42, and the inner temperature Tc is input from the temperature sensor 41, and then it is determined whether or not the pressure Pa is not less than a threshold value Pa3 and the inner temperature Tc is not less than a threshold value Tc3. If the pressure Pa is not less than the threshold value Pa3 and the inner temperature Tc is not less than the threshold value Tc3, the routine advances to step S140. If the pressure Pa is less than the threshold value Pa3 or the inner temperature Tc is less than the threshold value Tc3, the routine returns to step S110.

In step S140, the condenser fan 21 is forcibly set to have the highest rotational rate at a high setting value Hi. Then, the routine advances to step S150.

In step S150, the pressure Pa is input from the pressure sensor 42, and the inner temperature Tc is input from the temperature sensor 41, and then it is determined whether or not the pressure Pa is less than a threshold value Pa3$d$ and the inner temperature Tc is less than a threshold value Tc3$d$. The threshold value Pa3$d$ is slightly smaller than the above threshold value Pa3, and the threshold value Tc3$d$ is slightly smaller than the threshold value Tc3. If the pressure Pa is less than the threshold value Pa3$d$ and the inner temperature Tc is less than the threshold value Tc3$d$, the routine advances to step S160. If the pressure Pa is not less than the threshold value Pa3$d$ or the inner temperature Tc is not less than the threshold value Tc3$d$, the routine advances to step S170.

In step S160, the forcible setting of the condenser fan 21 at the high setting value Hi is canceled. Then, the routine returns to step S130.

In step S170, the pressure Pa is input from the pressure sensor 42, and the inner temperature Tc is input from the temperature sensor 41, and then it is determined whether or not the pressure Pa is not less than a threshold value Pa5 and the inner temperature Tc is not less than a threshold value Tc5. If the pressure Pa is not less than the threshold value Pa5 and the inner temperature Tc is not less than the threshold value Tc5, the routine advances to step S180. If the pressure Pa is less than the threshold value Pa5 or the inner temperature Tc is less than the threshold value Tc5, the routine returns to step S150.

In step S180, the rotational rate of the electric compressor 5 is changed. Specifically, the rotational rate of the electric compressor 5 is decreased. Then, the present routine is ended.

The aforementioned threshold values Tc1 to Tc5, Pa1 to Pa5 may be appropriately set depending on the influences on the capacity of and the load on the various vehicle air conditioning equipment, and the like. It is unnecessary to set the respective threshold values (Tc1 to Tc5) of the inner temperature and the respective threshold values of the pressure (Pa1 to Pa5) to have different values from one another.

According to the vehicle air conditioning apparatus 1 of the present embodiment, through the aforementioned control, if the inner temperature Tc of the electric compressor 5 detected by the temperature sensor 41, and the pressure Pa of the refrigerant after being compressed detected by the pressure sensor 42 are not less than the respective threshold values (Tc1 to Tc5, Pa1 to Pa5), the operational conditions of the various vehicle air conditioning equipment included in the vehicle air conditioning apparatus 1 (the blower fan 33 of the evaporator unit for on-vehicle battery cooling 3, the internal-external air switching damper 26, the condenser fan 21, and the electric compressor 5) are so changed as to reduce the load on the electric compressor 5.

Specifically, the blower fan 33 of the evaporator unit for on-vehicle battery cooling 3 is stopped to stop the cooling of the on-vehicle battery, thereby reducing the load on the electric compressor 5.

The internal-external air switching damper 26 is switched so that the internal air in the vehicle interior is heat-exchanged with the refrigerant in the evaporator for vehicle-interior air conditioning 23, or switched to the internal air mode, thereby suppressing the amount of the heat exchange in the evaporator for vehicle-interior air conditioning 23 while maintaining the vehicle-interior temperature, and thus reducing the load of the electric compressor 5.

The rotational rate of the blower fan 33 of the evaporator unit for on-vehicle battery cooling 3 is so decreased as to lower the amount of the heat exchange in the evaporator for on-vehicle battery cooling 32, thereby reducing the load on the electric compressor 5.

By forcibly setting the condenser fan 21 to have the high setting value Hi, the refrigerant temperature after passing through the condenser 6 becomes lowered, so that the cooling performance can be enhanced. Accordingly, it is possible to suppress the compression at the electric compressor 5 to reduce the load thereon.

In addition, in each case of the above controls to reduce the load on the electric compressor 5, supply amount of the refrigerant to the evaporator unit for vehicle interior air conditioning 2 is sufficiently secured, and thus it is possible to maintain the air conditioning performance for the vehicle interior.

Needless to mention that the load on the electric compressor 5 may be reduced by decreasing the rotational rate of the electric compressor 5.

The operational conditions of the various vehicle air conditioning equipment in the vehicle air conditioning apparatus 1 are changed based on the inner temperature Tc of the electric compressor 5 and the pressure Pa of the refrigerant in the above manner, thereby allowing selection of an appropriate method to reduce the load on the electric compressor 5 depending on the load of the electric compressor 5. Accordingly, it is possible to suppress increase in temperature of the electric compressor 5, particularly increase in temperature of the control unit 20 included in the electric compressor 5, thus attaining protection of the electric compressor 5.

In the present embodiment, not only the rotational rate of the electric compressor 5 is decreased, but also the other various vehicle air conditioning equipment, such as the blower fan 33 of the evaporator unit for on-vehicle battery cooling 3, the internal-external air switching damper 26, and the condenser fan 21, is controlled at the time of increase in load on the electric compressor 5, thereby reducing the load on the electric compressor 5 through a fine adjustment, and thus effectively suppressing increase in temperature of the control unit 20. Furthermore, by changing the operational conditions of the various vehicle air conditioning equipment as aforementioned, it is possible to prevent deterioration of the air conditioning performance for the vehicle interior, thereby enhancing comfort of occupants in the vehicle interior.

In the present embodiment, the operational conditions of the various vehicle air conditioning equipment are changed based on both the inner temperature Tc of the electric compressor 5 and the pressure Pa of the refrigerant; therefore it is possible to reduce the load before increase in temperature of the control unit 20 occurs based on the pressure Pa of the refrigerant, and it is possible to securely suppress increase in temperature of the control unit 20 based on the inner temperature Tc of the electric compressor 5 at the same time.

In the above embodiment, reduction of the load on the electric compressor 5 is attained through the following five controls: stopping of the on-vehicle battery cooling, switching to the internal air mode, decreasing of the rotational rate of the blower fan 33 in the evaporator unit for on-vehicle battery cooling 3, increasing of the rotational rate of the condenser fan 21, and decreasing of the rotational rate of the electric compressor 5; and at least one of these controls to restrict the operation of the evaporator for on-vehicle battery cooling 32, such as stopping of the on-vehicle battery cooling, switching to the internal air mode, and decreasing of the rotational rate of the blower fan 33 in the evaporator unit for on-vehicle battery cooling 3, may be selected, and on this basis, some of the above five controls may be appropriately used in combination thereof.

The present invention may be applicable to a wide range of vehicles, each equipped with both the evaporator unit for vehicle-interior air conditioning 2 and the evaporator unit for on-vehicle battery cooling 3, and may also be applicable to hybrid vehicles and electric vehicles, for example.

EXPLANATION OF REFERENCE SIGNS 1 vehicle air conditioning apparatus (refrigerant circulation apparatus)
2 evaporator unit for vehicle-interior air conditioning (vehicle-interior air conditioner)
3 evaporator unit for on-vehicle battery cooling (on-vehicle battery cooler)
5 electric compressor
23 evaporator for vehicle-interior air conditioning
26 internal-external air switching damper (internal-external air switching unit)
32 evaporator for on-vehicle battery cooling
33 blower fan
40 air-conditioning control unit (control unit)
41 temperature sensor (temperature detection unit)
42 pressure sensor (pressure detection unit)

The invention claimed is:

1. A refrigerant circulation apparatus comprising:
    a vehicle-interior air conditioner configured to cool an interior of a vehicle;
    an on-vehicle battery cooler including an evaporator for on-vehicle battery cooling configured to cool an on-vehicle battery mounted on the vehicle;
    an electric compressor configured to compress and supply a refrigerant to one or both of the vehicle-interior air conditioner and the on-vehicle battery cooler;
    a temperature detection unit configured to detect a temperature of the electric compressor;
    a pressure detection unit configured to detect a pressure of the refrigerant compressed by the electric compressor; and
    a control unit configured to restrict operation of the evaporator for on-vehicle battery cooling so as to reduce load on the electric compressor based on the temperature of the electric compressor and the pressure of the refrigerant.

2. The refrigerant circulation apparatus according to claim 1, wherein
    the vehicle-interior air conditioner comprises: the evaporator for vehicle-interior air conditioning; and an internal-external air switching unit configured to allow conditioned air to be switched to external air outside the vehicle interior or to internal air in the vehicle interior, the conditioned air heat-exchanged with the refrigerant in the evaporator for vehicle-interior air conditioning to be supplied into the vehicle-interior, and
    the control unit switches the internal-external air switching unit to heat-exchange the internal air in the vehicle interior with the refrigerant so as to reduce the load on the electric compressor.

3. The refrigerant circulation apparatus according to claim 2, wherein
    the on-vehicle battery cooler includes a blower fan configured to supply the conditioned air to the evaporator for on-vehicle battery cooling,
    and
    the control unit decreases a rotational rate of the blower fan so as to reduce the load on the electric compressor.

4. The refrigerant circulation apparatus according to claim 3, further comprising:
    a condenser configured to cool the refrigerant by heat-exchanging the refrigerant compressed by the electric compressor with the external air outside the vehicle interior; and
    a condenser fan configured to introduce the external air outside the vehicle interior into the condenser,
    wherein
    the control unit increases a rotational rate of the condenser fan so as to reduce the load on the electric compressor.

5. The refrigerant circulation apparatus according to claim 4, wherein
    the electric compressor comprises: an electric motor configured to operate a compressor to compress the refrigerant; and electronic equipment for control so disposed adjacent to the electric motor as to control the operation of the electric motor,
    and
    the temperature detection unit detects a temperature of the electronic equipment for control.

6. The refrigerant circulation apparatus according to claim 3, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

7. The refrigerant circulation apparatus according to claim 2, further comprising:
a condenser configured to cool the refrigerant by heat-exchanging the refrigerant compressed by the electric compressor with the external air outside the vehicle interior; and
a condenser fan configured to introduce the external air outside the vehicle interior into the condenser,
wherein
the control unit increases a rotational rate of the condenser fan so as to reduce the load on the electric compressor.

8. The refrigerant circulation apparatus according to claim 7, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

9. The refrigerant circulation apparatus according to claim 2, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

10. The refrigerant circulation apparatus according to claim 1, wherein
the on-vehicle battery cooler includes a blower fan configured to supply the conditioned air to the evaporator for on-vehicle battery cooling,
and
the control unit decreases a rotational rate of the blower fan so as to reduce the load on the electric compressor.

11. The refrigerant circulation apparatus according to claim 10, further comprising:
a condenser configured to cool the refrigerant by heat-exchanging the refrigerant compressed by the electric compressor with the external air outside the vehicle interior; and
a condenser fan configured to introduce the external air outside the vehicle interior into the condenser,
wherein
the control unit increases a rotational rate of the condenser fan so as to reduce the load on the electric compressor.

12. The refrigerant circulation apparatus according to claim 11, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

13. The refrigerant circulation apparatus according to claim 10, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

14. The refrigerant circulation apparatus according to claim 1, further comprising:
a condenser configured to cool the refrigerant by heat-exchanging the refrigerant compressed by the electric compressor with the external air outside the vehicle interior; and
a condenser fan configured to introduce the external air outside the vehicle interior into the condenser,
wherein
the control unit increases a rotational rate of the condenser fan so as to reduce the load on the electric compressor.

15. The refrigerant circulation apparatus according to claim 14, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

16. The refrigerant circulation apparatus according to claim 1, wherein
the electric compressor comprises: an electric motor configured to operate a compressor to compress the refrigerant; and electronic equipment for control so disposed adjacent to the electric motor as to control the operation of the electric motor,
and
the temperature detection unit detects a temperature of the electronic equipment for control.

* * * * *